(12) United States Patent
Teodosio

(10) Patent No.: US 7,350,533 B1
(45) Date of Patent: Apr. 1, 2008

(54) METHOD FOR ACCESSING A PIPE AND APPARATUS THEREFOR

(76) Inventor: Nicholas A. Teodosio, 45 Maple Ave., Derby, CT (US) 06418

( * ) Notice: Subject to any disclaimer, the term of this patent is extended or adjusted under 35 U.S.C. 154(b) by 181 days.

(21) Appl. No.: 11/443,835

(22) Filed: May 31, 2006

(51) Int. Cl.
*B23B 41/08* (2006.01)
*F16K 1/48* (2006.01)

(52) U.S. Cl. .................................. 137/15.12; 137/318
(58) Field of Classification Search ............... 137/318, 137/317, 15.12, 15.13, 15.14; 408/67
See application file for complete search history.

(56) References Cited

U.S. PATENT DOCUMENTS

| 46,572 | A |  | 2/1865 | McClellano |  |
|---|---|---|---|---|---|
| 54,845 | A |  | 5/1866 | Bowen |  |
| 121,313 | A |  | 11/1871 | Bailey |  |
| 181,846 | A |  | 9/1876 | Hooton |  |
| 408,646 | A |  | 8/1889 | Arci |  |
| 459,638 | A | * | 9/1891 | Madden | 137/318 |
| 1,294,052 | A | * | 2/1919 | Clark | 137/320 |
| 1,701,786 | A | * | 2/1929 | McMurray | 137/318 |
| 3,734,112 | A | * | 5/1973 | Finney et al. | 137/15.13 |
| 4,345,613 | A | * | 8/1982 | Mills et al. | 137/317 |
| 4,519,415 | A | * | 5/1985 | Carn | 137/318 |
| 5,803,125 | A | * | 9/1998 | Bliss | 137/370 |
| 6,357,470 | B1 | * | 3/2002 | Evans et al. | 137/317 |

\* cited by examiner

*Primary Examiner*—Kevin Lee
(74) *Attorney, Agent, or Firm*—Ted Masters

(57) ABSTRACT

Method and apparatus for accessing the inside of a pipe includes a valve which connects to the pipe, a riser pipe, and an operating rod for selectively opening and closing the valve. The apparatus further includes a 5.25 inch cylindrical housing having a removable cover, the housing surrounding the valve, riser pipe, and operating rod. When the cover is removed, the valve is visible from the top of the housing.

7 Claims, 2 Drawing Sheets

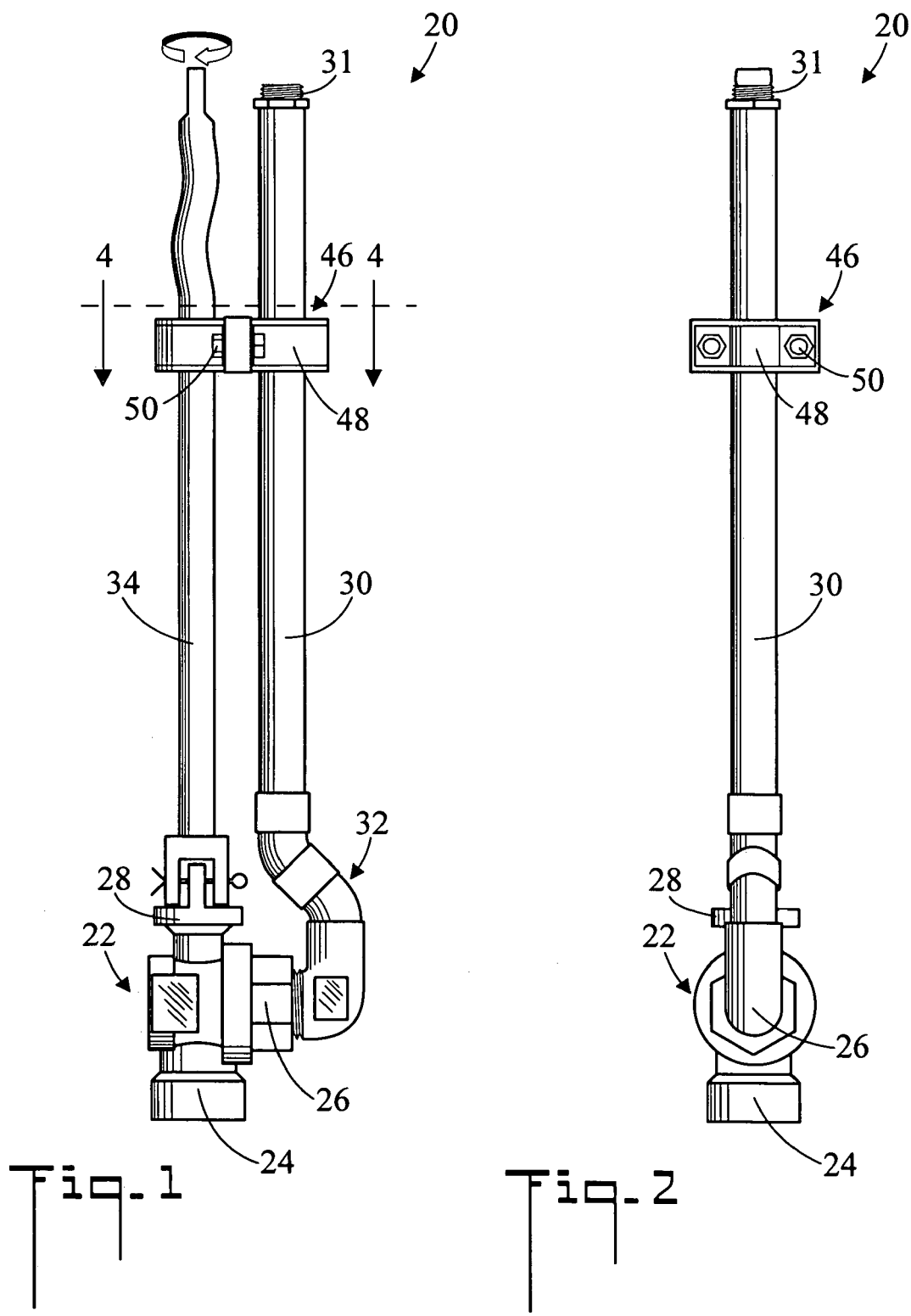

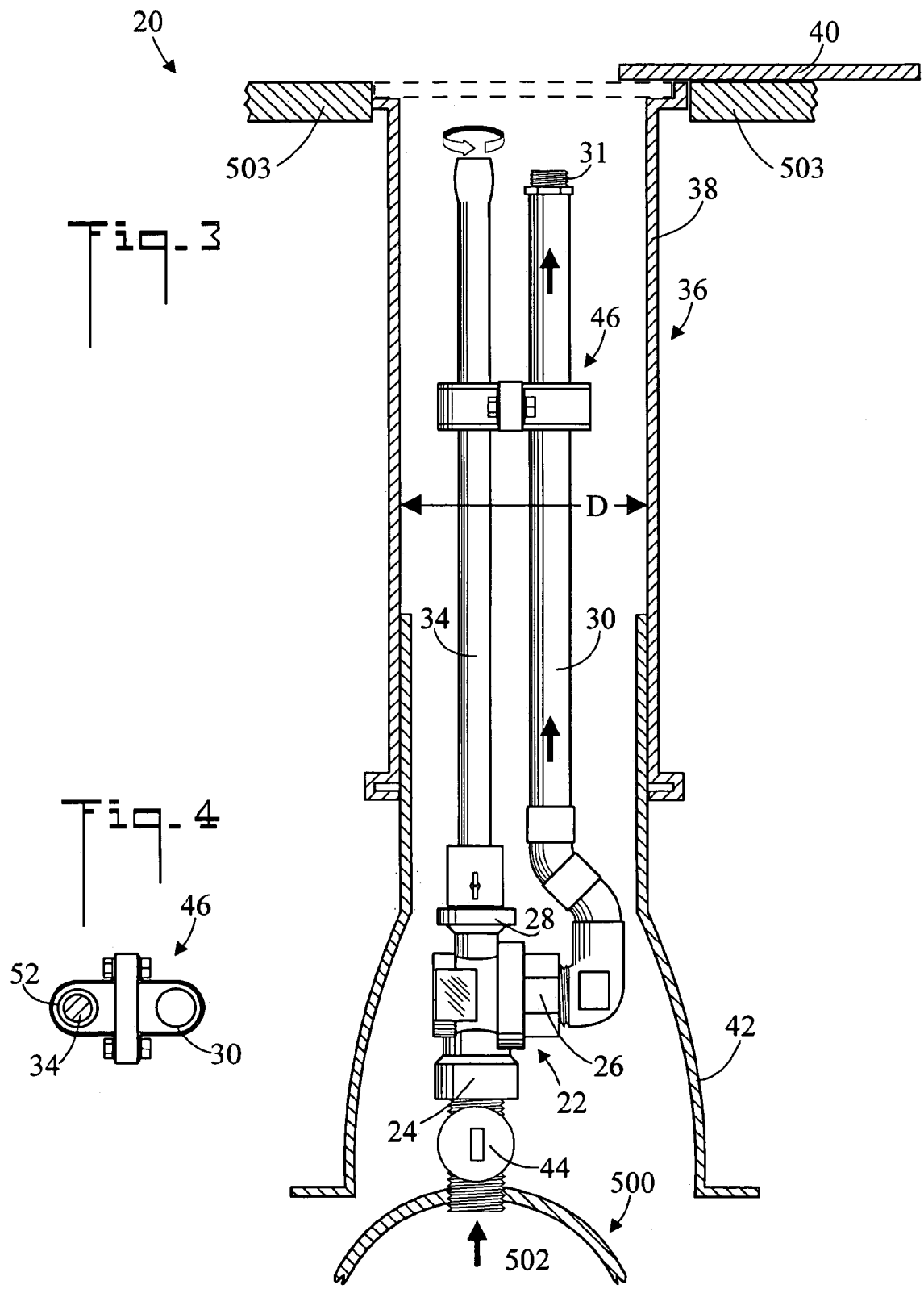

METHOD FOR ACCESSING A PIPE AND APPARATUS THEREFOR

TECHNICAL FIELD

The present invention pertains generally to a pipe such as a water main, and more particularly to a method and apparatus for obtaining access to the inside of the pipe.

BACKGROUND OF THE INVENTION

In some instances it is desirable to access the inside of a buried pipe such as a water main. The purpose for the access can be to remove air or sediment, perform pressure testing, inject a substance such as chlorine, or to effect a temporary connection. This access is typically accomplished by digging a large hole, constructing a access chamber with a 16 to 24 inch diameter cover, tapping into the pipe, and installing a conventional wheel valve and associated piping.

BRIEF SUMMARY OF THE INVENTION

The present invention is directed to a method and apparatus for accessing a pipe. The apparatus of the present invention is installed on top of a pipe such as a water main, and can be used to remove air and sediment from the water main, and can also be used to inject chlorine, perform pressure testing, or effect a temporary connection. Once the present invention is installed, all of the aforementioned operations can be conveniently accomplished with no digging around the pipe. All of these operations can be accomplished without exposing (digging) around the pipe. The present invention can provide access through concrete and paved roadways, grass areas, bridge decks, and manhole vaults or chambers.

In accordance with a preferred embodiment of the invention, a method for selectively accessing the inside of a pipe, includes:

(a) providing a pipe having an inside;
(b) providing apparatus for accessing the inside of the pipe, the apparatus including:
   a valve having an input, an output, and a rotating control member which selectively opens or closes the valve;
   a riser pipe connected to the output;
   an operating rod connected to the rotating control member, wherein the operating rod may be utilized to rotate the rotating control member thereby selectively opening or closing the valve;
   attachment means for connecting the input of the valve to the inside of the pipe;
   a housing having a 5.25 inch diameter, a top portion having a removable cover, and a bottom portion;
(c) drilling and tapping a hole in the pipe;
(d) using the attachment means to connect the input of the valve to the inside of the pipe, wherein the riser pipe and the operating rod are disposed in a vertical orientation;
(e) installing the housing around the valve, the riser pipe and the operating rod, wherein the bottom portion of the housing is adjacent the pipe and the housing surrounds but does not touch the valve, the riser pipe and the operating rod;
(f) with the removable cover removed, observing that the valve is visible from the top portion of the housing; and,
(f) turning the operating rod to selectively open or close the valve.

The method further including:
in step (b), a connector which connects the riser pipe to the operating rod;
the connector attached to the riser pipe; and,
the connector having a though hole for loosely receiving the operating rod.

The method further including:
in step (b), the attachment means including a corporation.

The method further including:
removing the valve from the attachment means.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a front elevation view of apparatus for accessing the inside of a pipe in accordance with the present invention;

FIG. 2 is a side elevation view of the apparatus;

FIG. 3 is a front elevation view of the apparatus connected to a pipe; and,

FIG. 4 is a view along line 4-4 of FIG. 1.

DETAILED DESCRIPTION OF THE INVENTION

Referring initially to FIGS. 1 and 2 there are illustrated front elevation and side elevation views respectively of apparatus for accessing the inside of a pipe in accordance with the present invention, generally designated as 20. Apparatus 20 includes a valve 22 having an input 24, an output 26, and a rotating control member 28 which selectively opens or closes valve 22. In the shown embodiment, valve 22 is a 1 inch quarter-turn angle ball valve. Such a valve 22 is available from A.Y. McDonald Corp., part number 4604BF. Input 24 is connectable to the inside 502 of a pipe 500, such as a buried water main. As defined herein, inside 502 refers to the cavity within the pipe 500 in which water or another liquid flows. A vertically extending riser pipe 30 is connected to output 26. In the shown embodiment riser pipe 30 is 1 inch copper tube, and is connected to output 26 with brass or cast copper fittings 32. The top end 31 of riser pipe 30 is threaded to accommodate connection to an external device (not shown). An operating rod 34 is connected to rotating control member 28, and used for turning same. In the shown embodiment the operating rod has a ⅝ inch diameter and is available from A.Y. McDonald Corp. When input 24 is connected to the inside 502 of pipe 500, operating rod 34 may be utilized to rotate rotating control member 28 thereby opening or closing valve 22 thereby selectively connecting inside 502 of pipe 500 to riser pipe 30. The top of operating rod 34 is turned with a key (not shown) such as A.Y. McDonald part number 304B (curb box key). Valve 22 and operating rod 34 are shown closed in FIGS. 1 and 2, and open in FIG. 3.

Referring also to FIG. 3, a vertically oriented substantially cylindrical housing 36 has a top portion 38 which has a removable circular cover 40 and a bottom portion 42. In FIG. 3 cover 40 is shown in the removed position laying on pavement 503. In the installed position (dashed), cover 40 reside flush with pavement 503. In FIG. 3, housing 36 is shown in cross section. In the installed configuration, valve 22, riser pipe 30, and operating rod 34 are disposed within housing 36 (but do not touch housing 36) so that valve 22 is disposed in bottom portion 40 of housing 36, and when removable cover 40 is removed (as shown in FIG. 3) valve 22 is visible from top portion 38 of housing 36. This visibility feature is important so that a user may monitor for valve 22 leaks or other apparatus 20 problems. In the shown embodiment housing 36 is a gate box which has a 5.25 inch inside diameter D. While known in the art, such a gate box has never before been used to accommodate both a riser pipe 30 and an operating rod 34. Top portion 38 of housing 36 slides with respect to bottom portion 42 so that housing 36 may be lengthened or shortened to accommodate different pipe 500 depths. Similarly, riser pipe 30 and operating rod 34 may be lengthened or shortened as is required.

Still referring to FIG. 3, valve 22 is connected to inside 502 of pipe 500 by a one inch ball corporation 44. Corporation 44 is installed usihg a special tapping machine, and has a valve for allowing or blocking fluid flow. Such a corporation is available from A.Y. McDonald as part number 3121B1. When valve 22 is opened using operating rod 34, the fluid contents on the inside 502 of pipe 500 are free to flow (shown by arrows) through corporation 44, valve 22, and riser pipe 30. Similarly, a substances could be injected under pressure into the inside 502 of pipe 500 in the opposite direction. An advantage of the present invention is that valve 22, riser pipe 30, and operating rod 34 may be quickly removed from corporation 44 by simply setting corporation 44 to block fluid flow and unscrewing valve 22.

FIG. 4 is a view along line 4-4 of FIG. 1. Also referring to FIGS. 1 and 2, a connector 46 connects riser pipe 30 to operating rod 34. Connector 46 is fixedly attached to riser pipe 30 using a strap 48 and bolts 50. Connector 46 has a through hole 52 for loosely receiving operating rod 34. Connector 46 is not so large as to block visual access of valve 22 from the top of housing 36 (refer also to FIG. 3).

In terms of use, a method for selectively accessing the inside of a pipe, includes:
 (a) providing a pipe 500 having an inside 502;
 (b) providing apparatus 20 for accessing the inside 502 of pipe 500, the apparatus 20 including:
  a valve 22 having an input 24, an output 26, and a rotating control member 28 which selectively opens or closes valve 28;
  a riser pipe 30 connected to output 26;
  an operating rod 34 is connected to rotating control member 28, wherein operating rod 34 may be utilized to rotate rotating control member 28 thereby selectively opening or closing valve 22;
  attachment means for connecting input 24 of valve 22 to the inside 502 of pipe 500;
  a housing 36 having a 5.25 inch diameter, a top portion 38 having a removable cover, 40 and a bottom portion 42;
 (c) drilling and tapping a hole in pipe 500;
 (d) using the attachment means to connect input 24 of valve 22 to the inside 502 of pipe 500, wherein riser pipe 30 and operating rod 34 are disposed in a vertical orientation;
 (e) installing housing 36 around valve 22, riser pipe 30 and operating rod 34, wherein bottom portion 42 of housing 36 is adjacent pipe 500 and housing 36 surrounds but does not touch valve 22, riser pipe 30 and operating rod 34;
 (f) with removable cover 40 removed, observing that valve 22 is visible from top portion 38 of housing 36; and,
 (f) turning operating rod 34 to selectively open or close valve 22.

The method further including:
 in step (b), a connector 46 which connects riser pipe 30 to operating rod 34;
 connector 46 attached to riser pipe 30; and,
 connector 46 having a though hole 52 for loosely receiving operating rod 34.

The method further including:
 in step (b), the attachment means including a corporation 44.

The method further including:
 removing valve 22 from the attachment means.

The preferred embodiments of the invention described herein are exemplary and numerous modifications, variations, and rearrangements can be readily envisioned to achieve an equivalent result, all of which are intended to be embraced within the scope of the appended claims.

I claim:

1. A method for selectively accessing the inside of a pipe, comprising:
 (a) providing a pipe having an inside;
 (b) providing apparatus for accessing said inside of said pipe, said apparatus including:
  a valve having an input, an output, and a rotating control member which selectively opens or closes said valve;
  a riser pipe connected to said output;
  an operating rod connected to said rotating control member, wherein said operating rod may be utilized to rotate said rotating control member thereby selectively opening or closing said valve;
  attachment means for connecting said input of said valve to the inside of said pipe;
  a housing having a 5.25 inch diameter, a top portion having a removable cover, and a bottom portion;
 (c) drilling and tapping a hole in said pipe;
 (d) using said attachment means to connect said input of said valve to said inside of said pipe, wherein said riser pipe and said operating rod are disposed in a vertical orientation;
 (e) installing said housing around said valve, said riser pipe and said operating rod, wherein said bottom portion of said housing is adjacent said pipe and said housing surrounds but does not touch said valve, said riser pipe and said operating rod;
 (f) with said removable cover removed, observing that said valve is visible from said top portion of said housing; and,
 (f) turning said operating rod to selectively open or close said valve.

2. The method according to claim 1, further including:
 in step (b), a connector which connects said riser pipe to said operating rod;
 said connector attached to said riser pipe; and,
 said connector having a though hole for loosely receiving said operating rod.

3. The method according to claim 1, further including:
 in step (b), said attachment means including a corporation.

4. The method according to claim 1, further including:
 removing said valve from said attachment means.

5. Apparatus for accessing the inside of a pipe, comprising:
 a valve having an input, an output, and a rotating control member which selectively opens or closes said valve;
 said input connectable to the inside of the pipe;
 a riser pipe connected to said output;

an operating rod connected to said rotating control member;

wherein when said input is connected to the inside of the pipe, said operating rod may be utilized to rotate said rotating control member thereby opening or closing said valve thereby selectively connecting the inside of the pipe to said riser pipe; and, a housing having a 5.25 inch diameter, a top portion having a removable cover, and a bottom portion, wherein said valve, said riser pipe, and said operating rod are disposed within said housing but do not touch said housing so that said valve is disposed in said bottom portion of said housing, and when said removable cover is removed said valve is visible from said top portion of said housing.

6. The apparatus according to claim 5, further including:

a connector which connects said riser pipe to said operating rod;

said connector attached to said riser pipe; and, said connector having a though hole for loosely receiving said operating rod.

7. The apparatus according to claim 5, further including:

a corporation for attaching said valve to the inside of the pipe.

* * * * *

UNITED STATES PATENT AND TRADEMARK OFFICE
CERTIFICATE OF CORRECTION

PATENT NO. : 7,350,533 B1 Page 1 of 1
APPLICATION NO. : 11/443835
DATED : April 1, 2008
INVENTOR(S) : Nicholas A. Teodosio It is certified that error appears in the above-identified patent and that said Letters Patent is hereby corrected as shown below:

In column 3, line 66, "(f)" should read --(g)--
In column 4, line 48, "(f)" should read --(g)--

Signed and Sealed this

First Day of July, 2008

JON W. DUDAS
*Director of the United States Patent and Trademark Office*